United States Patent
Kim et al.

(10) Patent No.: US 9,296,064 B2
(45) Date of Patent: Mar. 29, 2016

(54) NANO-GRAINED MULTILAYER COPPER ALLOY SHEET HAVING HIGH STRENGTH AND HIGH ELECTRICAL CONDUCTIVITY, AND METHOD FOR MANUFACTURING SAME

(75) Inventors: Hyoung Wook Kim, Changwon-si (KR); Cha Yong Lim, Changwon-si (KR)

(73) Assignee: KOREA INSTITUTE OF MACHINERY & MATERIALS (KR)

( * ) Notice: Subject to any disclaimer, the term of this patent is extended or adjusted under 35 U.S.C. 154(b) by 329 days.

(21) Appl. No.: 13/979,467

(22) PCT Filed: Dec. 26, 2011

(86) PCT No.: PCT/KR2011/010073
§ 371 (c)(1),
(2), (4) Date: Aug. 29, 2013

(87) PCT Pub. No.: WO2012/096456
PCT Pub. Date: Jul. 19, 2012

(65) Prior Publication Data
US 2015/0037609 A1    Feb. 5, 2015

(30) Foreign Application Priority Data

Jan. 12, 2011 (KR) .......................... 10 2011 0002941

(51) Int. Cl.
| | |
|---|---|
| B32B 15/20 | (2006.01) |
| B23K 20/04 | (2006.01) |
| B23K 20/233 | (2006.01) |
| B23K 20/24 | (2006.01) |
| B32B 15/01 | (2006.01) |

(52) U.S. Cl.
CPC ............... *B23K 20/04* (2013.01); *B23K 20/233* (2013.01); *B23K 20/24* (2013.01); *B32B 15/01* (2013.01); *B32B 15/20* (2013.01); *B23K 2203/12* (2013.01); *B32B 2250/42* (2013.01); *B32B 2307/202* (2013.01); *B32B 2307/54* (2013.01); *Y10T 428/1291* (2015.01)

(58) Field of Classification Search
None
See application file for complete search history.

(56) References Cited

U.S. PATENT DOCUMENTS

2004/0069463 A1    4/2004    Saijo et al.

FOREIGN PATENT DOCUMENTS

| JP | 03284869 A | 12/1991 |
|---|---|---|
| JP | 0623571 A | 2/1994 |
| JP | 2005029829 A | 2/2005 |

(Continued)

OTHER PUBLICATIONS

Japanese Office Action, Dated Oct. 24, 2014, Application No. 2013-549357, 2 Pages

(Continued)

*Primary Examiner* — Adam Krupicka
(74) *Attorney, Agent, or Firm* — Brooks Kushman P.C.

(57) ABSTRACT

In a high strength and high electrical conductive nano crystalline grain multi-layer copper alloy sheet, a plurality of high strength and high electrical conductive nano crystalline grain multi-layer sheets manufactured by roll-bonding an oxygen free copper (OFC) alloy sheet and a deoxidized low-phosphorous copper (DLP) alloy sheet are plastically bonded by roll-bonding method so that an OFC alloy layer and a DLP alloy layer are alternated to each other to have electrical conductivity of 85 IACS (%) or more and tensile strength of 500 MPa or more.

3 Claims, 8 Drawing Sheets

(56) References Cited

FOREIGN PATENT DOCUMENTS

| | | | |
|---|---|---|---|
| JP | 2006219705 | A | 8/2006 |
| JP | 2010013691 | A | 1/2010 |
| KR | 1020030073721 | A | 9/2003 |
| KR | 1020030096234 | A | 12/2003 |
| KR | 100807847 | A | 2/2008 |
| KR | 1020080091929 | A | 10/2008 |

OTHER PUBLICATIONS

PCT International Search Report Dated Jul. 2, 2012, Application No. PCT/KR2011/010073, Applicant Korea Institute of Machinery & Materials, 5 Pages.
PCT International Preliminary Report on Patentability Written Opinion Dated Jul. 16, 2013, Application No. PCT/KR2011/010073, Applicant Korea Institute of Machinery & Materials, 6 Pages.
Japanese Final Office Action, Dated Mar. 17, 2015, Application No. 2013-549357, 3 Pages.

NANO-GRAINED MULTILAYER COPPER ALLOY SHEET HAVING HIGH STRENGTH AND HIGH ELECTRICAL CONDUCTIVITY, AND METHOD FOR MANUFACTURING SAME

CROSS-REFERENCE TO RELATED APPLICATIONS

This application is a U.S. national phase of PCT Application No. PCT/KR2011/010073 filed Dec. 26, 2011, which claims priority to Korean Application No. KR 10-2011-0002941 filed Jan. 12, 2011, the disclosures of which are incorporated in their entirety by reference herein

TECHNICAL FIELD

The present invention relates to high strength and high electrical conductive nano crystalline grain multi-layer copper sheets and a manufacturing method of the same that improve both strength and electrical conductivity by accumulatively roll-bonding a copper alloy having high strength and a copper alloy having high electrical conductivity.

BACKGROUND ART

An accumulative roll-bonding (ARB) method is one of severe plastic deformation methods that improve a mechanical characteristic by ultra-micronizing a crystalline grain level of a metallic material up to a submicron range.

In general, in order to manufacture a copper alloy sheet having high strength and electrical conductivity, the copper alloy sheet has been manufactured by rolling a copper alloy manufactured by adding an alloy element to increase the strength by rolling, and the like.

However, when a content of the alloy is increased in order to improve the strength, electrical conductivity and rollability deteriorates, as a result, there is a limit in acquiring both high strength and high electrical conductivity.

In other words, in existing plastic deformation methods such as rolling or extruding, when a processing amount is increased, a shape (cross sectional area) of a target material is inevitably changed, and as a result, there may be a limit in accumulating deformation energy in a material. Therefore, existing plastic deformation methods cannot actually show a large effect in crystalline grain micronization and high strength of a metallic material.

As a result, a method of increasing the strength by micronizing a crystalline grain to a hundred-nanometer size by performing consecutive rolling processing by using the accumulative roll-bonding method is used.

In other words, the accumulative roll-bonding method has been applied on steel and aluminum (Al) materials which are representative as structural materials but does not larger advantages than existing reinforcing methods such as a high solution reinforcing method, a deposition reinforcing method, and the like only by achieving high strength in terms of commercialization.

Therefore, in order to advance the commercialization by maximally showing a characteristic of the existing accumulative roll-bonding (ARB) method, a lot of research and development are in progress with respect to an accumulative roll-bonding method for achieving crystalline grain micronization and high strength.

For example, Korea Patent Unexamined Publication No. 2006-0013211 discloses a manufacturing method of high-strength CU workpiece by using an accumulative roll-bonding process.

In brief, copper sheets having a predetermined length, which are surface-treated are overlapped and fixed and thereafter, rolled and bonded and the bonded copper sheets are cut, but such a process is repeated several times to manufacture copper sheets that are overlapped in multiple layers.

However, there is a limit in increasing a pure copper alloy sheet by crystalline grain micronization.

Further, when the existing high-strength copper alloy sheets accumulated and roll-bonded in order to increase the strength, a plurality of cracks occur in the roll-bonding and the sheets are not bonded, and as a result, it is impossible to manufacture a quality sheet.

Moreover, a problem is caused in which electrical conductivity is significantly decreased when the high-strength copper alloy sheet is used.

Japanese Patent Unexamined Publication No. 2001-184788 discloses alumina distributed reinforced copper manufactured by roll-bonding with alumina grains applied and inserted between oxygen free copper sheets.

However, the publication has a problem in which when the alumina grains are applied between the oxygen free copper sheets and thereafter, rolled, uniform application of alumina is impossible.

DISCLOSURE

Technical Problem

In order to solve the problem in the related art, an object of the present invention is to provide high strength and high electrical conductive nano crystalline grain multi-layer copper alloy sheets having a uniform thickness and a manufacturing method of the same that improve strength and electrical conductivity by accumulatively roll-bonding heterogeneous copper alloys.

Technical Solution

In order to achieve the object, in a high strength and high electrical conductive nano crystalline grain multi-layer copper alloy sheet according to the present invention, an oxygen free copper (OFC) alloy and a deoxized low-phosphorous copper (DLP) alloy are plastically processed by roll-bonding (ARB) method to have electrical conductivity of 85 IACS (%) or more and tensile strength of 500 MPa or more.

In the multi-layer copper alloy sheet, an OFC alloy layer and a DLP alloy layer are alternately overlapped with each other.

The multi-layer copper alloy sheet includes two or more OFC alloy layers and DLP alloy layers.

A manufacturing method of a high strength and high electrical conductive nano crystalline grain multi-layer copper alloy sheet includes: a material preparing step of preparing a sheet formed by an oxygen free copper (OFC) alloy and a deoxidized low-phosphorous copper (DLP) alloy, a surface-treatment step of surface-treating the sheet, and a sheet forming step of forming a high strength and high electrical conductive nano crystalline grain multi-copper alloy sheet having electrical conductivity of 85 IACS (%) or more and tensile strength of 500 MPa or more by accumulatively roll-bonding the sheet.

The surface-treatment step includes a degreasing process of degreasing an outer surface of the sheet and an activation process of activating the outer surface of the sheet through wire brushing.

The sheet forming step is repeatedly performed sever times and when the sheet forming step is performed twice or more, the plurality of copper alloy sheets are plastically processed by the ARB method.

Effect of the Invention

High strength and high electrical conductive nano crystalline grain multi-layer copper alloy sheets according to the present invention are bonded by accumulatively overlapping and roll-bonding a copper alloy having high strength and a copper alloy having high electrical conductivity.

Accordingly, both the strength and the electrical conductivity are improved and the sheets have a uniform thickness.

MODE FOR INVENTION

Hereinafter, a configuration of high strength and high electrical conductive nano crystalline grain multi-layer copper alloy sheets according to the present invention will be described with reference to FIG. 1 which is accompanied.

Figure 1:
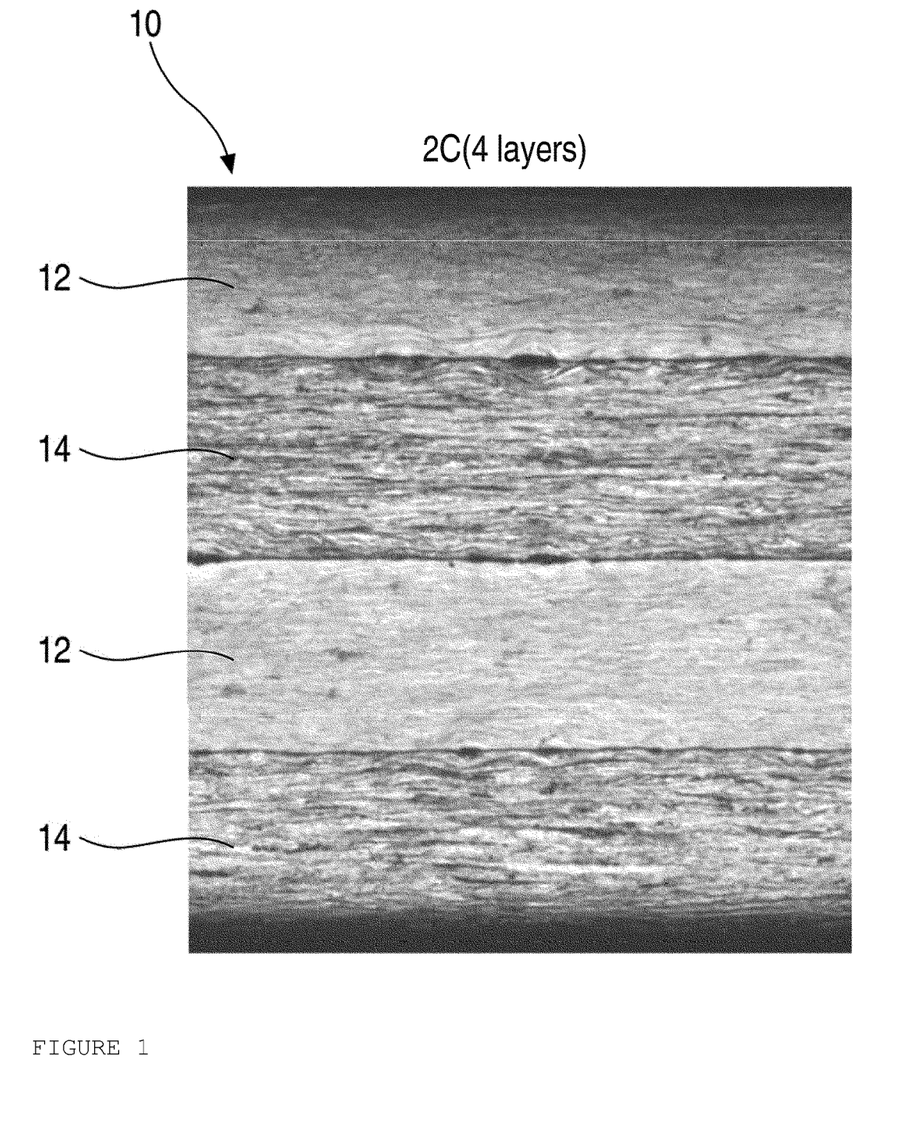
FIG. 1 is a longitudinal cross-sectional view illustrating high strength and high electrical conductive nano crystalline grain multi-layer copper alloy sheets according to the present invention.

FIG. 1 is a longitudinal cross-sectional view illustrating high strength and high electrical conductive nano crystalline grain multi-layer copper alloy sheets (hereinafter, referred to as a 'copper alloy sheet 10') according to the present invention.

As illustrated in the figure, the copper alloy sheet 10 is formed by accumulatively roll-bonding heterogeneous copper alloys and in the embodiment, the copper alloy sheet 10 has electrical conductivity of 85 IACS (%) or more and tensile strength of 500 MPa or more by roll-bonding of an oxygen free copper (OFC) alloy 12 and a deoxidized low-phosphorus copper (DLP) alloy 14.

That is, the copper alloy sheet 10 may be manufactured in four layers as illustrated in FIG. 1 by performing accumulative overlapping and roll-bonding to form two layers by overlapping the OFC alloy 12 and the DLP alloy 14 and thereafter, overlapping and roll-bonding the two formed layers in multiple layers.

In addition, the oxygen free copper (OFC) alloy 12 and the deoxidized low-phosphorus copper (DLP) alloy 14 are alternately stacked to preferably improve both electrical conductivity and strength.

Hereinafter, a manufacturing method of the copper alloy sheet 10 configured as above will be described with reference to FIGS. 2 and 3.

Figure 2:
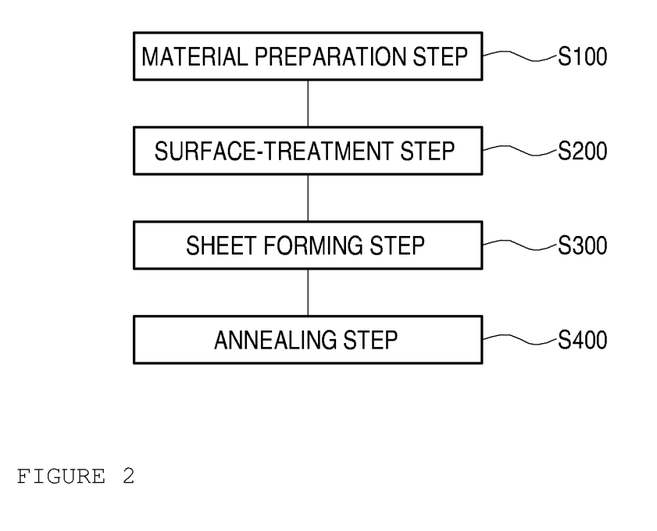
FIG. 2 is a process flowchart illustrating a manufacturing method of high strength and high electrical conductive nano crystalline grain multi-layer copper alloy sheets according to the present invention.
Figure 3:
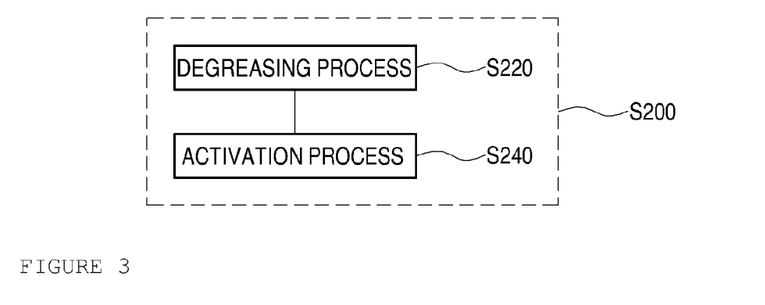
FIG. 3 is a process flowchart specifically illustrating a surface-treatment step which is one step in the manufacturing method of the high strength and high electrical conductive nano crystalline grain multi-layer copper alloy sheets according to the present invention.

FIG. 2 is a process flowchart illustrating a manufacturing method of high strength and high electrical conductive nano crystalline grain multi-layer copper alloy sheets according to the present invention. FIG. 3 is a process flowchart specifically illustrating a surface-treatment step which is one step in the manufacturing method of the high strength and high electrical conductive nano crystalline grain multi-layer copper alloy sheets according to the present invention.

As illustrated in the figures, the copper alloy sheet 10 is manufactured by sequentially performing a material preparing step (S100) of preparing a sheet formed by an oxygen free copper (OFC) alloy 12 and a deoxidized low-phosphorous copper (DLP) alloy 14, a surface-treatment step (S200) of surface-treating the sheet, and a sheet forming step (S300) of forming a high strength and high electrical conductive nano crystalline grain multi-copper alloy sheet 10 having electrical conductivity of 85 IACS (%) or more and tensile strength of 500 MPa or more by accumulatively roll-bonding the sheet.

In the material preparing step (S100), the oxygen free copper (OFC) alloy 12 is a component for increasing the electrical conductivity of the copper alloy sheet 10 and the deoxidized low-phosphorous copper (DLP) alloy 14 is a component for increasing the strength of the copper alloy sheet 10.

The OFC alloy 12 and the DLP alloy 14 prepared in the material preparation step (S100) are subjected to the surface-treatment step.

The surface-treatment step (S200) as a process that facilitates bonding of the OFC alloy 12 and the DLP alloy 14 in accumulative overlapping and roll-bonding includes a degreasing process (S220) of degreasing an outer surface of the alloy and an activation process (S240) of activating the outer surface of the alloy through wire brushing.

After the surface-treatment step (S200), the sheet forming step (S300) is performed. The sheet forming step (S300) is repeatedly performed several times and when the sheet forming step is performed twice or more, a plurality of multi-layer copper alloy sheets 10 are plastically deformed through a first roll-bonding method.

Hereinafter, an accumulative overlapping and roll-bonding device (hereinafter, referred to as a 'roll-bonding device 100') for consecutively performing the activation process (S240) and the sheet forming step (S300) will be described in detail with reference to FIGS. 4 and 5 which are accompanied.

Figure 4:
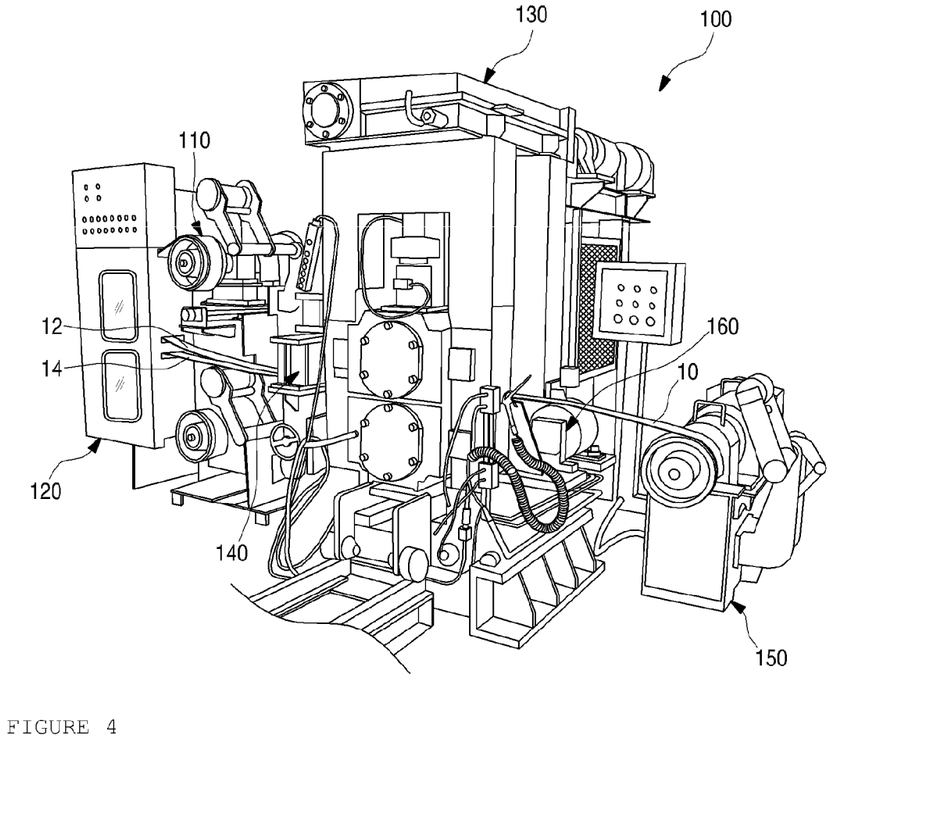
FIG. 4 is a perspective view illustrating an exterior configuration of a roll-bonding device adopted in a preferred embodiment of the present invention.

FIG. 4 is a perspective view illustrating an exterior configuration of a roll-bonding device adopted in a preferred embodiment of the present invention. FIG. 5 is an outline view specifically illustrating an internal configuration of the roll-bonding device adopted in the preferred embodiment of the present invention.

As illustrated in the figures, the roll-bonding device 100 as a device for manufacturing the copper alloy sheet 10 by consecutively receiving the OFC alloy 12 and the DLP alloy 14 in a sheet form includes an uncoil means 110 for keeping the OFC alloy 12 and the DLP alloy 14 at a left side with the OFC alloy 12 and the DLP alloy 14 wound.

The uncoil means 110 serves to keep the OFC alloy 12 and the DLP alloy 14 with a sheet shape having a predetermined width and a large length with the OFC alloy 12 and the DLP alloy 14 wound, and supply the OFC alloy 12 and the DLP alloy 14 which are selectively rotated and wound, and since the roll-bonding device 100 is a device for roll-bonding the OFC alloy 12 and the DLP alloy 14, the uncoil means 110 is constituted by a plurality of means so as to independently supply the OFC alloy 12 and the DLP alloy 14.

In the embodiment of the present invention, the uncoil means 110 has a rotational center on the same vertical line and has a roller shape in which outer surfaces are separated from each other, and the uncoil means 110 is configured by a pair to rotate in opposite directions to each other, thereby forcibly transport the OFC alloy 12 and the DLP alloy 14 wound with the uncoil means 110, respectively.

In addition, a surface-treatment means 120 is provided at a left side of the plurality of uncoil means 110.

The surface-treatment means 120 as a component for surface-treating one surface of outer surfaces of the OFC alloy 12 and the DLP alloy 14 through wire brushing is provided as many as the number corresponding to the uncoil means 110 to respectively surface-treat the OFC alloy 12 and the DLP alloy 14 received from the respective uncoil means 110.

A rolling means 130 is provided substantially at the center of the roll-bonding device 100. The rolling means 130 is a component for pressing and rolling the OFC alloy 12 and the DLP alloy 14 while passing a pair of rollers, and the OFC alloy 12 and the DLP alloy 14 that are rolled through the rolling means 130 are roll-bonded to become the copper alloy sheet 10.

A first guide 140 is provided between the rolling means 130 and the uncoil means 110. The first guide 140 as a component for guiding the OFC alloy 12 and the DLP alloy 14 that are surface-treated via the surface-treatment means 120 by passing the OFC alloy 12 and the DLP alloy 13 thereinto is configured to gradually decrease a separation distance at the time when the OFC alloy 12 and the DLP alloy 14 are transported in a right direction.

A recoil means 150 is provided at a right side of the rolling means 130. The recoil means 150 is a component for winding and keeping the overlapped and bonded copper alloy sheets 10 through the rolling means 130. A rotational speed of the recoil means 150 is preferably controlled by considering a transportation speed of the copper alloy sheet 10.

A second guide 160 is provided between the recoil means 150 and the rolling means 130. The second guide 160 as a component for guiding the copper alloy sheet 10 rolled through the rolling means 130 to the recoil means 150 also serves to improve linearity of the copper alloy sheet 10 simultaneously.

Hereinafter, a detailed configuration of the roll-boding device 100 configured as above will be described with reference to FIG. 5 which is accompanied.

Figure 5:
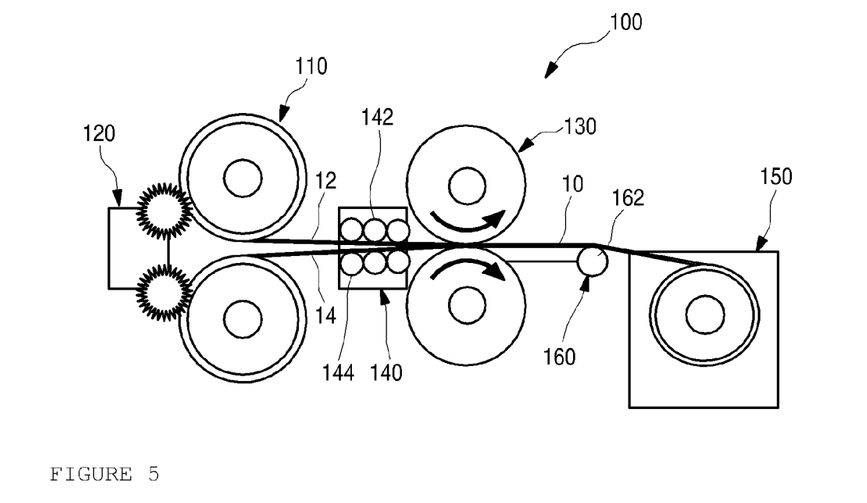
FIG. 5 is an outline view specifically illustrating an internal configuration of the roll-bonding device adopted in the preferred embodiment of the present invention.

FIG. 5 is an outline view specifically illustrating an internal configuration of the accumulative overlapping and roll-bonding device roll-bonding device adopted in the preferred embodiment of the present invention.

As illustrated in the figure, the OFC alloy 12 and the DLP alloy 14 are wound to an outer surface of the uncoil means 110 in opposite directions to each other, respectively, and are kept and provided with a sufficient length so that the copper alloy sheet 10 is manufactured through the rolling means 130.

In addition, the surface-treatment means 120 brushes surfaces of planes facing each other among both planes of the OFC alloy 12 and the DLP alloy 14 in order to more easily overlap and bond the OFC alloy 12 and the DLP alloy 14 through the rolling means 130 while rolling.

Therefore, when the facing surfaces of the OFC alloy 12 and the DLP alloy 14 that are surface-treated by the surface-treatment means 120 are activated to be rolled through the rolling means 130, bonding strength may increase.

The first guide 140 guides the OFC alloy 12 and the DLP alloy 14 that are surface-treated to be gathered to the center of a pair of rollers when the OFC alloy 12 and the DLP alloy 14 are transported to the rolling means 130.

To this end, the first guide 140 is configured to include a plurality of upper rollers 142 and a plurality of lower rollers 144.

Therefore, the upper roller 142 guides the OFC alloy 12 positioned at an upper side to the right direction and the lower roller 144 guides the DLP alloy 14 positioned at a lower side to the right direction.

In addition, the upper roller 142 and the lower roller 144 are configured to make the OFC alloy 12 and the DLP alloy 14 close to each other when the OFC alloy 12 and the DLP alloy 14 are transported to the right direction.

That is, the OFC alloy 12 and the DLP alloy 14 that pass between the upper roller 142 and the lower roller 144 are pressed and rolled by the rolling means 130. In this case, when the OFC alloy 12 and the DLP alloy 14 enter with a large separation distance, it is difficult to manufacture the copper alloy sheet 10 which is uniform.

Therefore, the upper roller 142 and the lower roller 144 control the separation distance to be decreased when the OFC alloy 12 and the DLP alloy 14 are transported. To this end, the upper roller 142 and the lower roller 144 are preferably configured in such a manner that the positions of rotational centers of the upper rollers 142 and the lower rollers 144 are different from each other.

For example, as illustrated in FIG. 5 which is accompanied, three upper rollers 142 is configured with the rotational center decreased in the right direction and three lower rollers 144 are configured with the rotational centers increased in the right direction to control the separation distance between the OFC alloy 12 and the DLP alloy 14 to be decreased.

In the embodiment of the present invention, the first guide 140 configures the upper roller 142 and the lower roller 144 as the embodiment, but if the separation distance between the OFC alloy 12 and the DLP alloy 14 is within a range to control the separation distance to be decreased, various modifications can be made.

The second guide 160 includes a guide roller 162 to guide the transportation of the copper alloy sheet 10 by using a rotating motion and the guide roller 162 increases the linearity of the copper alloy sheet 10 to help improving quality.

In more detail, since an upper end of an outer peripheral surface of the guide roller 162 is configured to be positioned at the center of the rolling means 130, that is, on the same line as the copper alloy sheet 10, the copper alloy sheet 10 that is passed out of the rolling means 130 is prevented from being rapidly bent to acquire the copper alloy sheet 10 having a uniform organization.

Hereinafter, a process of overlapping and bonding the OFC alloy 12 and the DLP alloy 14 by using the roll-bonding device 100 configured as above will be described with reference to FIG. 5 which is accompanied.

First, the OFC alloy 12 and the DLP alloy 14 from which oil and foreign materials are removed through a degreasing process are wound to and kept in the uncoil means 110.

In addition, while the OFC alloy 12 and the DLP alloy 14 are uncoiled by the rotation of the uncoil means 110, the surface is activated by a surface processing means 120.

In this case, surfaces of the OFC alloy 12 and the DLP alloy 14 to contact each other are surface-treated to more easily bond the OFC alloy 12 and the DLP alloy 14.

While the OFC alloy 12 and the DLP alloy 14 that are surface-treated by the surface-treatment means 120 pass through the first guide 140, the separation distance is decreased to provide the OFC alloy 12 and the DLP alloy 14 to an internal center of the rolling means 130.

That is, the upper OFC alloy 12 that contacts the upper roller 142 is guided to be gradually inclined in lower and right directions by the upper roller 142 and the lower DLP alloy 14 that contacts the lower roller 144 is guided to be gradually inclined in upper and right directions by the lower roller 144 to be close to each other.

Thereafter, while the OFC alloy 12 and the DLP alloy 14 that are close to each other pass through the rolling means 130, the OFC alloy 12 and the DLP alloy 14 are roll-bonded to become the copper alloy sheet 10.

The copper alloy sheet 10 is transported in parallel to a direction to discharge the copper alloy sheet 10 from the rolling means 130 by the second guide 160, and the linearity is increased.

Thereafter, a copper alloy sheet P of which a transportation direction is guided by the second guide 160 is wound to and kept in the recoil means 150, and as a result, consecutive manufacturing of the copper alloy sheet 10 is completed.

The copper alloy sheet 10 wound to the recoil means 150 is provided in plural to be respectively installed in the uncoil means 110 and such a process is repeated several times to manufacture the copper alloy sheet 10 constituted by a plurality of layers.

Figure 6:
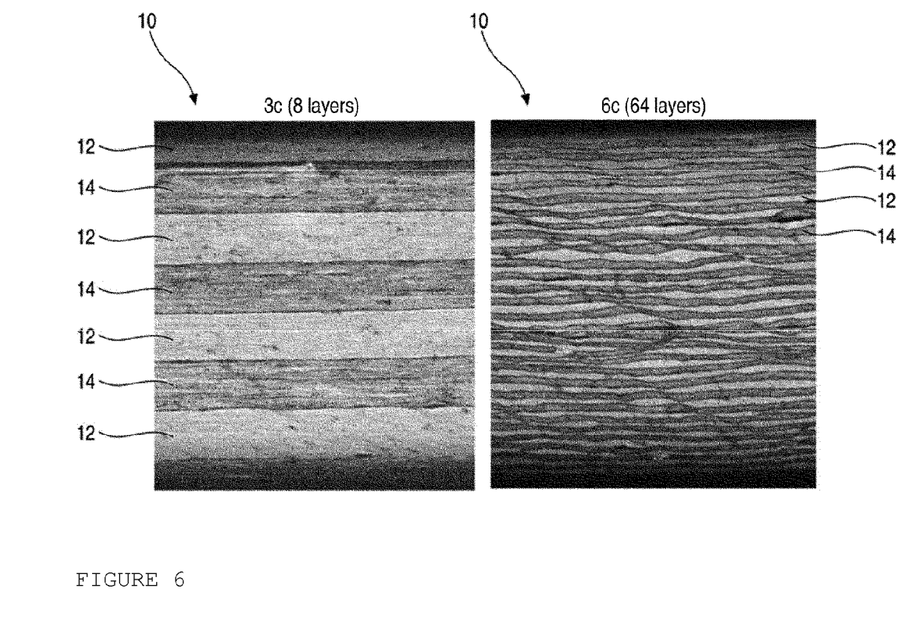
FIG. 6 is a longitudinal cross-sectional view illustrating high strength and high electrical conductive nano crystalline grain multi-layer copper alloy sheets according to another embodiment of the present invention.

As the embodiment, referring to FIG. 6 which is accompanied, the copper alloy sheet 10 is accumulatively roll-bonded several times, and as a result, the OFC alloy 12 and the DLP alloy 14 may be configured to be alternately constituted by 8 layers, 16 layers, 32 layers, and 64 layers.

Hereinafter, a property of the copper alloy sheet 10 according to the present invention will be described with reference to FIGS. 7 and 8 which are accompanied.

Figure 7:
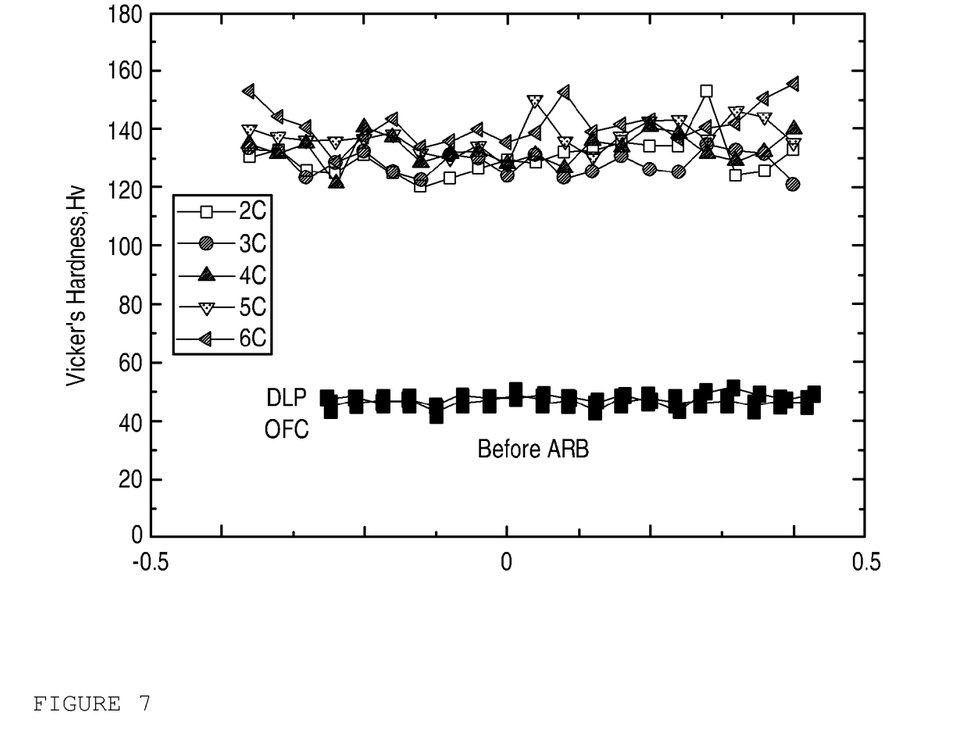
FIG. 7 is a graph illustrating a strength change depending on a change in the number of execution times of a sheet forming step in the high strength and high electrical conductive nano crystalline grain multi-layer copper alloy sheets according to the present invention.

FIG. 7 is a graph illustrating a strength change depending on a change in the number of execution times of a sheet forming step in the high strength and high electrical conductive nano crystalline grain multi-layer copper alloy sheets according to the present invention. FIG. 8 is a graph illustrating a change in tensile strength and elongation depending on the change in the number of execution times of the sheet forming step in the high strength and high electrical conductive nano crystalline grain multi-layer copper alloy sheets according to the present invention.

First, as illustrated in FIG. 7, when a change in hardness of the copper alloy sheet 10 repeatedly formed at twice, three times, four times, five times, six times by overlapping the plurality of copper alloy sheets 10 in which the OFC alloy 12 and the DLP alloy 14 are respectively provided on each one layer is compared with that of a comparative example (a DLP alloy and an OFC alloy which are not roll-bonded), it is confirmed that the copper alloy sheet 10 which is accumulatively roll-bonded shows hardness of 120 Hv or more to be twice or more higher than the comparative example showing hardness of approximately 50 Hv.

Figure 8:
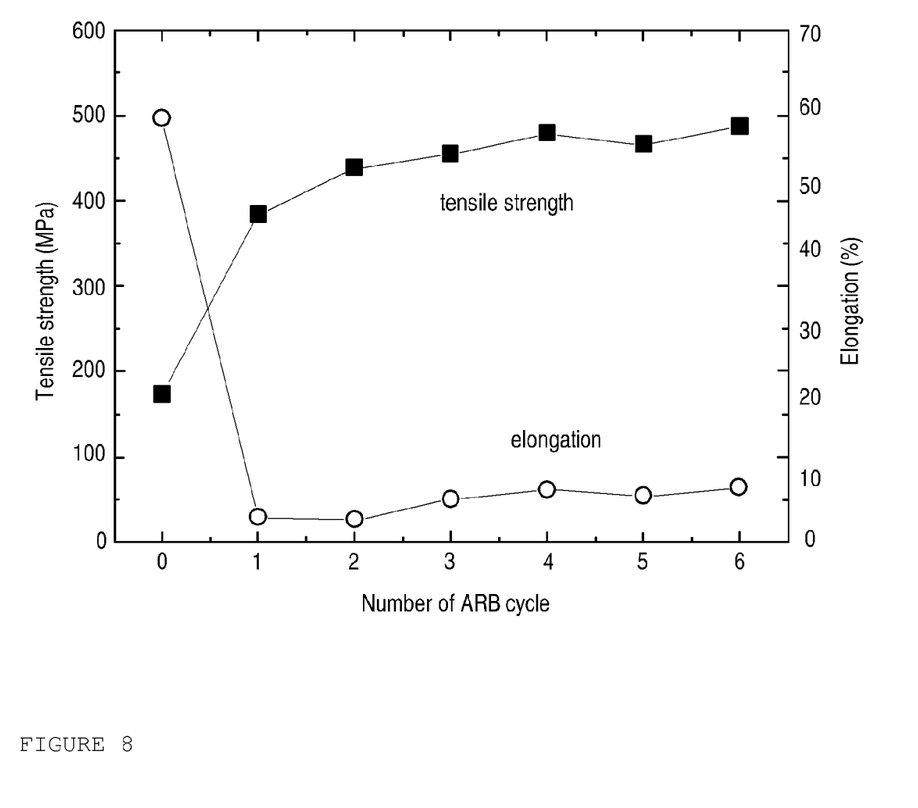
FIG. 8 is a graph illustrating a change in tensile strength and elongation depending on the change in the number of execution times of the sheet forming step in the high strength and high electrical conductive nano crystalline grain multi-layer copper alloy sheets according to the present invention.

In addition, as illustrated in FIG. 8, a comparative example in which the sheet forming step (S300) is not performed shows tensile strength of 180 MPa and elongation of 60%, but a preferred embodiment in which the sheet forming step (S300) is performed shows tensile strength of 500 MPa or more and elongation of 8% or less.

Further, it is confirmed that the elongation and the tensile strength increase as the number of execution times of the sheet forming step (S300) increases.

Meanwhile, an annealing step (S400) may be selected performed for the copper alloy sheet 10 in order to improve the properties such as the electrical conductivity and the tensile strength.

Whether the sheet forming step (S300) is performed and the change in electrical conductivity depending on the number of execution times of the sheet forming step (S300) will be described with reference to FIG. 9 which is accompanied.

Figure 9:
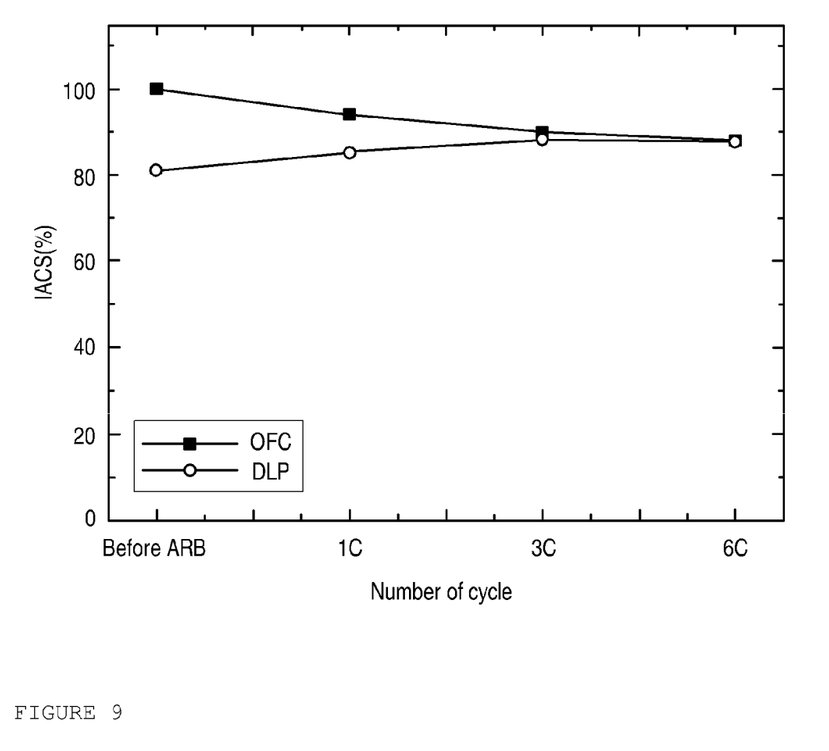
FIG. 9 is a graph illustrating a change in electrical conductivity of an OFC sheet and a DLP sheet tensile strength and elongation depending on the change in the number of execution times of the sheet forming step in the high strength and high electrical conductive nano crystalline grain multi-layer copper alloy sheets according to the present invention.

FIG. 9 is a graph illustrating a change in electrical conductivity of an OFC alloy 12 and a DLP alloy depending on the change in the number of execution times of the sheet forming step (S300) in the high strength and high electrical conductive nano crystalline grain multi-layer copper alloy sheets 10 according to the present invention.

As illustrated in the figure, before performing the sheet forming step (S300), the OFC alloy 12 shows electrical conductivity close to 100 IACS (%) and the DLP alloy 14 shows electrical conductivity of approximately 80 IACS (%).

However, the copper alloy sheet 10 manufactured by performing the sheet forming step (S300) shows electrical conductivity of 85 IACS (%) or more, and the electrical conductivity of the OFC alloy 12 and the electrical conductivity of the DLP alloy 14 have a tendency to be close to each other.

Figure 10:
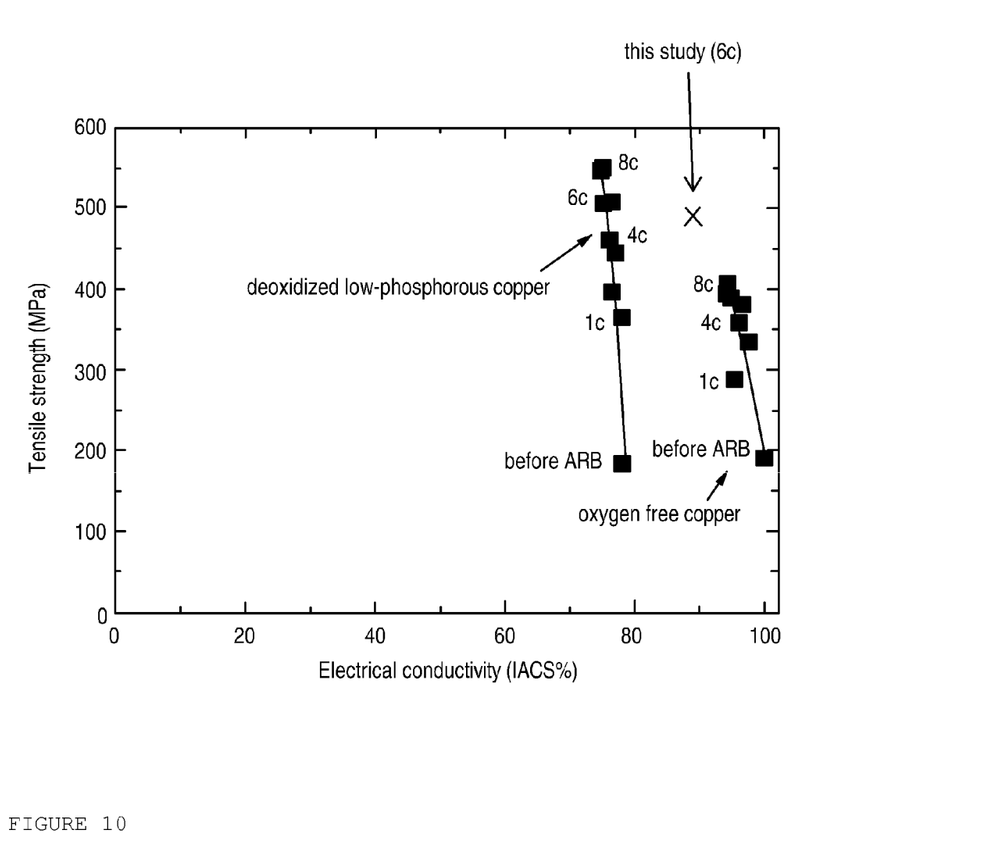
FIG. 10 is a graph illustrating comparison of changes of strength and electrical conductivity when the high strength and high electrical conductive nano crystalline grain multi-layer copper alloy sheets and comparison materials are manufactured by the same method according to the present invention.

When the experimental result is aggregated to be summarized with reference to FIG. 10, the copper alloy sheet 10 according to the present invention has a property complemented with strength and electrical conductivity as compared with the OFC alloy 12 having high conductivity and low strength and the DLP alloy 14 having low electrical conductivity and relatively low strength.

That is, the copper alloy sheet 10 has higher tensile strength and lower electrical conductivity than the OFC alloy 12 and a little lower tensile strength and higher electrical conductivity than the DLP alloy 14.

Therefore, it may be found that the copper alloy sheet 10 may be controlled to have various electrical conductivity and strength depending on the number of execution times of the sheet forming step (S300). The scope of the present invention is not limited to the described embodiments and a lot of other transformations can be made based on the present invention by those skilled in the art within the technical scope.

The invention claimed is:

1. A high strength and high electrical conductive nano crystalline grain multi-layer copper alloy sheet comprising:

an oxygen free copper (OFC) alloy and a deoxidized low-phosphorous copper (DLP) alloy that are repeatedly roll-bonded to have electrical conductivity of 85 IACS (%) or more and tensile strength of 500 MPa or more.

2. The high strength and high electrical conductive nano crystalline grain multi-layer copper alloy sheet of claim 1, wherein an OFC alloy layer and a DLP alloy layer alternately overlap with each other.

3. The high strength and high electrical conductive nano crystalline grain multi-layer copper alloy sheet of claim 2, wherein the multi-layer copper alloy sheet includes two or more OFC alloy layers and DLP alloy layers.

* * * * *